United States Patent Office 2,771,148
Patented Nov. 20, 1956

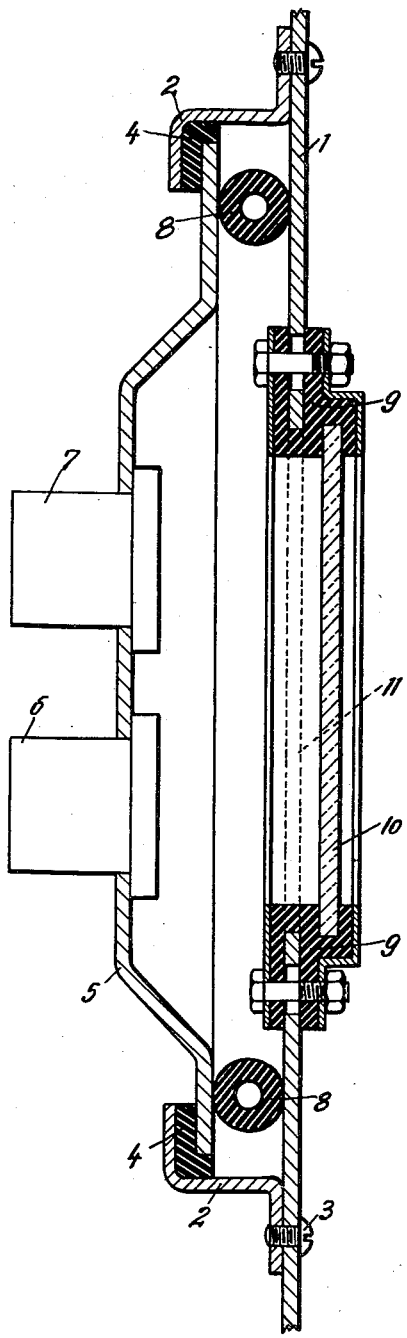

2,771,148

INSTRUMENT PANEL FOR MOTOR VEHICLES

Friedrich K. H. Nallinger, Stuttgart, Germany, assignor to Daimler-Benz Aktiengesellschaft, Stuttgart-Unterturkheim, Germany Application September 4, 1952, Serial No. 307,789

Claims priority, application Germany September 8, 1951

3 Claims. (Cl. 180—90)

My invention relates to an instrument panel for motor vehicles.

It is the object of the present invention to provide an instrument panel of light weight and simple design which is inexpensive, permits of easy assembly, and has favorable sound-insulating properties minimizing the transfer of noise through the instruments to the passenger compartment.

According to a preferred feature of the present invention, a plate supporting the instruments is mounted in spaced relationship to the panel on the back thereof behind a window provided therein, the instruments being visible through the window pane, sound-absorbing material being interposed between the panel and the supporting plate. Preferably, the pane is likewise fixed in position by means of a sound-absorbing fixture.

Further objects of my invention will appear from the description of a preferred embodiment thereof, and the features of novelty will be pointed out in the claims. I wish it to be clearly understood, however, that the description following hereinafter of an example of my invention serves the purpose of explanation rather than that of limitation of the invention.

In the drawing, a vertical section through the instrument panel is illustrated.

The panel 1 preferably mounted in the customary manner in front of the driver's seat in the motor vehicle in a more or less vertical or slightly inclined position has a frame 2 fixed to its back by suitable means, such as screws 3. The frame 2 surrounds a supporting plate 5 engaging over the edge thereof. The supporting plate 5 may have any desired peripheral shape, for instance a circular or an oval shape. A strip 4 of sound-absorbing material, such as sponge rubber or any other suitable resilient plastic, is interposed between the frame 2 and the marginal zone of plate 5. A spacing element of resilient material which may be formed by a thick-walled rubber tube 8 is arranged coextensive with the periphery of plate 5 being slightly spaced inwardly therefrom and is inserted between the marginal zone of plate 5 and the panel 1. In this manner, the plate 5 is mounted in spaced substantially parallel relationship to the panel 1.

A central portion of the supporting plate 5 is depressed in a dish-like manner and is provided with apertures in which the instruments, such as a speedometer, a clock etc., are mounted as shown at 6 and 7. The instruments are located behind a pane 10 of transparent material, such as safety glass or a suitable plastic, closing a window 11 provided in the panel 1. Preferably, sound-absorbing material is interposed between the pane 10 and the panel 1. In the present embodiment, such sound-absorbing material is formed by a rubber strip 9 provided with an internal groove engaging over the pane 10 and with an external groove engaging over the margin of opening 11. The rubber strip 9 is suitably fixed to the panel 1 by bolts and nuts, and outer inner sheet metal linings are provided on the rubber strip 9.

It is to be understood, of course, that materials other than sponge rubber may be used for the elements 4, 8 and 9.

The space between plate 5 and the panel 1 including the window pane 10 is effectively sealed by the rubber tube 8. In this manner, sound that may be conveyed to the instruments will not be transferred to the panel 1 and the pane 10 to any substantial extent.

Moreover, it will be noted that the assembly is simple and that the instruments are readily accessible and that the sealed space between the plate 5 and the pane 10 will result in a desirable heat insulation of the passenger compartment.

While I have described a preferred embodiment of my invention, I wish it to be clearly understood that same is in no way limited to the details thereof, but is capable of numerous modifications within the scope of the appended claims.

What I claim is:

1. An instrument panel for motor vehicles comprising a panel provided with a window, a pane closing said window, a supporting plate, a frame fixed to said panel and surrounding said supporting plate over the edge thereof on the side of said supporting plate opposite said panel, a strip of sound-absorbing material interposed between said frame and the marginal zone of said plate, a spacing element of resilient material coextensive with the periphery of said plate and inserted between the marginal zone thereof and said panel to keep said plate spaced from said panel and sealing the space therebetween, and instruments carried by said plate behind said pane being visible therethrough.

2. The combination claimed in claim 1 in which said sound-absorbing material is rubber.

3. The combination according to claim 1 further comprising sound-absorbing means between said panel and said window.

References Cited in the file of this patent

UNITED STATES PATENTS

| 1,585,636 | Anibal | May 25, 1926 |
| 1,602,191 | Feely | Oct. 5, 1926 |
| 1,787,684 | Jacobi | Jan. 6, 1931 |
| 1,835,577 | Terry | Dec. 8, 1931 |